(12) United States Patent
Joseph et al.

(10) Patent No.: US 10,810,473 B1
(45) Date of Patent: Oct. 20, 2020

(54) COGNITIVE MULTI-CARD HANDLING SYSTEM FOR AUTOMATIC TESTING OF TRANSACTION APPARATUS AND TESTING METHOD THEREOF

(71) Applicant: Tata Consultancy Services Limited, Mumbai (IN)

(72) Inventors: Manecius Selvakumar Joseph, Ernakulam (IN); Vinod Kumar Sekaran, Ernakulam (IN); Roshy Manayil John, Ernakulam (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 16/552,192

(22) Filed: Aug. 27, 2019

(51) Int. Cl.
*G06K 13/08* (2006.01)
*G06K 9/00* (2006.01)
*G06Q 20/10* (2012.01)
*G06Q 20/20* (2012.01)

(52) U.S. Cl.
CPC ......... *G06K 13/08* (2013.01); *G06K 9/00442* (2013.01); *G06Q 20/1085* (2013.01); *G06Q 20/20* (2013.01)

(58) Field of Classification Search
CPC ............... G06K 13/08; G06K 9/00442; G06Q 20/1085; G06Q 20/20
See application file for complete search history.

(56) References Cited

U.S. PATENT DOCUMENTS

| 5,388,815 | A  | * | 2/1995 | Hill | B42D 5/027 |
| | | | | | 270/32 |
| 6,719,198 | B2 | * | 4/2004 | Bretl | G06K 13/08 |
| | | | | | 235/380 |
| 9,327,853 | B2 | * | 5/2016 | Tang | B65B 11/50 |

FOREIGN PATENT DOCUMENTS

| CN | 204066270 | 12/2014 |
| CN | 105159830 | 12/2015 |
| CN | 106842081 | 6/2017 |

* cited by examiner

*Primary Examiner* — Seung H Lee
(74) *Attorney, Agent, or Firm* — Finnegan, Henderson, Farabow, Garrett & Dunner LLP

(57) ABSTRACT

The present disclosure provides a cognitive multi-card handling system for automatic testing of transaction apparatus and a testing method. Conventional techniques such as manual testing and automatic testing require lot of testing time and have limitations to test with number of test cards and different card types, identifying required test card from heterogeneous stack of multiple test cards and without much manual intervention. The disclosed cognitive multi-cards handling system comprising a mechanical sub-system and a multi-card handling sub-system provides a mechanism to test number of test cards of different card types, identify and eject the required test card from a heterogeneous stack of multiple test cards, as per the test case to perform the transaction operations. The disclosed testing method ensures smooth completion of automatic testing process consisting of thousands of test cases without manual intervention.

17 Claims, 7 Drawing Sheets

COGNITIVE MULTI-CARD HANDLING SYSTEM FOR AUTOMATIC TESTING OF TRANSACTION APPARATUS AND TESTING METHOD THEREOF

TECHNICAL FIELD

The disclosure herein generally relates to banking and financial equipment, and particularly to cognitive multi-card handling systems for automatic testing of transaction apparatus and methods for testing the same.

BACKGROUND

Testing of transaction apparatus such as Point Of Sale (POS) machine, Automated Teller Machine (ATM) and so on used by banking, financial and administration facilities, is a crucial step before releasing such transaction apparatus into business markets by manufacturers. Rapid technological advancements necessitate frequent hardware and software upgrades, the transaction apparatus should be reliable, scalable, easily maintainable, highly secure and easily customizable as per business needs from time to time, for making transaction operations in different ways. Designing and executing test cases is a cumbersome job and require lot of time, considering different settings and configurations of these transaction apparatus and related applications. Therefore, significant budget is required for testing the transaction apparatus by manufacturers to prevent problems that may occur at customer end.

Conventional techniques employ thousands of test cases for testing the transaction apparatus and are executed manually using multiple test cards of different types which is time consuming. Also remembering a required test card from multiple test cards for testing a given test case is a difficult, tiresome job and sometimes a human operator may present a wrong test card resulting in an unsuccessful completion of the test process.

Conventional techniques that employ automated mechanisms with card handling systems for performing test operations are not geared to test multiple test cards of different card types and do require manual intervention at some stage of the testing.

SUMMARY

Embodiments of the present disclosure present technological improvements as solutions to one or more of the above-mentioned technical problems recognized by the inventors in conventional systems.

In an aspect, there is provided a cognitive multi-card handling system for automatic testing of a transaction apparatus, the system comprising: a mechanical sub-system comprising: a linear mechanism for moving a card out vent to a position of a required test card from a card stack; a cam setup cooperating with the linear mechanism for ejecting the required test card from the card stack; and a multi-card handling sub-system comprising: an image capturing module configured to capture an image of a face of each test card from a plurality of test cards to be loaded into the card stack, wherein the plurality of test cards include one or more of a magnetic strip card, a smart card, a non-contact smart card or a combination thereof; a cognitive supervisory module configured to: extract card details of each test card from the captured images, wherein the extracted card details include service provider of a test card, type of the test card, test card number and validity of the test card; assign a unique sequence number to each test card from the plurality of test cards while loading into the card stack, wherein the unique sequence number represents the position of a corresponding test card in the card stack; store the extracted card details of each test card along with a corresponding unique sequence number in a database; receive one or more test cases from a plurality of test cases for performing one or more transaction operations to test the transaction apparatus, wherein each test case comprises a test script description having one or more of service provider of the required test card, type of account of the required test card, security Personal Identification Number (PIN) number of the required test card, the type of the required test card, the required test card number and the one or more transaction operations; identify the required test card and the corresponding unique sequence number thereof from the database, by decoding the test script description associated with the received one or more test cases from the plurality of test cases; configure a motion step involving number of rotations by the linear mechanism for positioning the card out vent to select the identified required test card from the card stack, based on the identified unique sequence number; eject the identified required test card using the cam setup, by generating commands, to perform the one or more transaction operations by the transaction apparatus; and update the database with altered sequence numbers of remaining test cards after the identified required test card is ejected, wherein the altered sequence numbers of the remaining test cards represent altered positions of the remaining test cards in the card stack; and a vision based monitoring module configured to: visually verify card stack arrangement comprising configuration of the mechanical sub-system and positioning of the test cards in the card stack; and notify the cognitive supervisory module in case of abnormality in the card stack arrangement based on an output of verifying the card stack arrangement.

In another aspect, there is provided a method for automatic testing of a transaction apparatus, where the transaction apparatus is operatively connected to a cognitive multi-card handling system, the method comprising the steps of: loading plurality of test cards one after the other into the card stack of the cognitive multi-card handling system, wherein the plurality of test cards include one or more of a magnetic strip card, a smart card, a non-contact smart card or a combination thereof; capturing an image of a face of each test card from the plurality of test cards to be loaded into a card stack of the cognitive multi-card handling system; extracting card details of each test card from the captured images, wherein the extracted card details include service provider of a test card, type of the test card, test card number and validity of the test card; assigning a unique sequence number to each test card from the plurality of test cards while loading into the card stack, wherein the unique sequence number represents a position of a corresponding test card in the card stack; storing the extracted card details of each test card along with a corresponding unique sequence number in a database of the cognitive multi-card handling system; receiving one or more test cases from a plurality of test cases for performing one or more transaction operations to test the transaction apparatus, wherein each test case comprises a test script description having one or more of the name of service provider of the required test card, type of account of the required test card, security Personal Identification Number (PIN) number of the required test card, the type of the required test card, the required test card number and the one or more transaction operations; identifying the required test card and the corresponding unique sequence number thereof from the database, by decoding the test script description associated with the received one or more test cases from the plurality of test cases; ejecting the identified required test card using a cam setup of the cognitive multi-card handling system, by generating commands, to perform the one or more transaction operations by the transaction apparatus; updating the database with altered unique sequence numbers of remaining test cards after the required test card is ejected, wherein the altered unique sequence numbers of the remaining test cards represent altered positions of the remaining test cards in the card stack; submitting the ejected test card to the transaction apparatus; completing the one or more transaction operations by the transaction apparatus, as per the one or more test cases with the ejected test card; reloading the ejected test card into the card stack of the cognitive multi-card handling system, after completing the one or more transaction operations by the transaction apparatus; visually verifying card stack arrangement by a vision based monitoring module of the cognitive multi-card handling system, to comprising configuration of a mechanical sub-system and positioning of the test cards in the card stack of the cognitive multi-card handling system; and notifying a cognitive supervisory module of the cognitive multi-card handling system in case of abnormality in the card stack arrangement based on an output of verifying the card stack arrangement In an embodiment of the present disclosure, the system is connected to a robotic arm configured to cooperate with the transaction apparatus and further configured to: receive a control signal corresponding to the one or more test cases from the plurality of test cases for initiating the one or more transaction operations; pick up the required test card that is ejected from the card out vent; submit the required test card that is ejected to the transaction apparatus for performing one or more transaction operations corresponding to the one or more test cases from the plurality of test cases; receive an acknowledgement of completion of the one or more transaction operations corresponding to the one or more test cases from the plurality of test cases; and reload the test card into the card stack after completion of the one or more transaction operations corresponding to the one or more test cases from the plurality of test cases associated with the test card.

In an embodiment of the present disclosure, the image capturing module is further configured to capture an image of the face of the ejected test card while reloading into the card stack, after executing the one or more transaction operations by the transaction apparatus.

In an embodiment of the present disclosure, the cognitive supervisory module is further configured to perform one or more of: reloading of the ejected test card by: extracting the card details of the ejected test card from the captured image thereof when reloading the ejected test card into the card stack; verifying the ejected test card number from the extracted card details with the database; assign a new unique sequence number to the ejected test card corresponding to a topmost available position in the card stack; and update the database with the assigned new unique sequence number for the reloaded test card; and decode the test script description associated with the received one or more test cases from the plurality of test cases to identify an order of execution of the one or more test cases from the plurality of test cases.

In an embodiment of the present disclosure, the robotic arm is configured to submit the required test card that is ejected, to the transaction apparatus, either by swiping, inserting or tapping, based on the type of the ejected test card.

In an embodiment of the present disclosure, the transaction apparatus is a Point Of Sale (POS) machine or an Automated Teller Machine (ATM).

In an embodiment of the present disclosure, the step of submitting the ejected test card to the transaction apparatus comprises receiving a control signal corresponding to the one or more test cases from the plurality of test cases for initiating the one or more transaction operations, the submitting includes either by swiping, inserting or tapping, based on the type of the ejected test card.

In an embodiment of the present disclosure, the submitting also includes manually entering the ejected test card number, the security Personal Identification Number (PIN) number of the ejected test card, the validity of the ejected test card, if the step of swiping, inserting or tapping fails.

In an embodiment of the present disclosure, the step of submitting the ejected test card to the transaction apparatus is performed by a robotic arm.

In an embodiment of the present disclosure, the step of identifying the required test card and the corresponding unique sequence number thereof from the database is preceded by decoding the test script description associated with the received one or more test cases from the plurality of test cases to identify an order of execution of the one or more test cases from the plurality of test cases.

In an embodiment of the present disclosure, the step of reloading the test card into the card stack of the cognitive multi-card handling system comprises: receiving an acknowledgement of completion of the one or more transaction operations of a corresponding to the one or more test cases from the plurality of test cases; and capturing an image of the face of the ejected test card while reloading into the card stack.

In an embodiment of the present disclosure, the step of reloading the ejected test card into the card stack comprises: extracting the card details of the ejected test card from the captured image thereof when reloading the ejected test card into the card stack of the cognitive multi-card handling system; verifying the ejected test card number from the extracted card details with the database of the cognitive multi-card handling system; assigning a new unique sequence number to the ejected test card corresponding to a topmost available position in the card stack of the cognitive multi-card handling system; and updating the database with the assigned new unique sequence number for the reloaded test card.

In an embodiment of the present disclosure, the step of ejecting is preceded by configuring a motion step by the cognitive supervisory module of the cognitive multi-card handling system, the motion step involving number of rotations by a linear mechanism for positioning a card out vent of the cognitive multi-card handling system for selecting the identified required test card from the card stack, based on the identified unique sequence number.

In an embodiment of the present disclosure, the step of ejecting is followed by a step of picking the ejected test card by the robotic arm.

In an embodiment of the present disclosure, the step of reloading is performed by the robotic arm.

In an embodiment of the present disclosure, the method further comprises generating an automatic test report of the transaction apparatus, after the one or more of the plurality of test cases are completed.

It is to be understood that both the foregoing general description and the following detailed description are exemplary and explanatory only and are not restrictive of the embodiments of the present disclosure, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Figure 1:
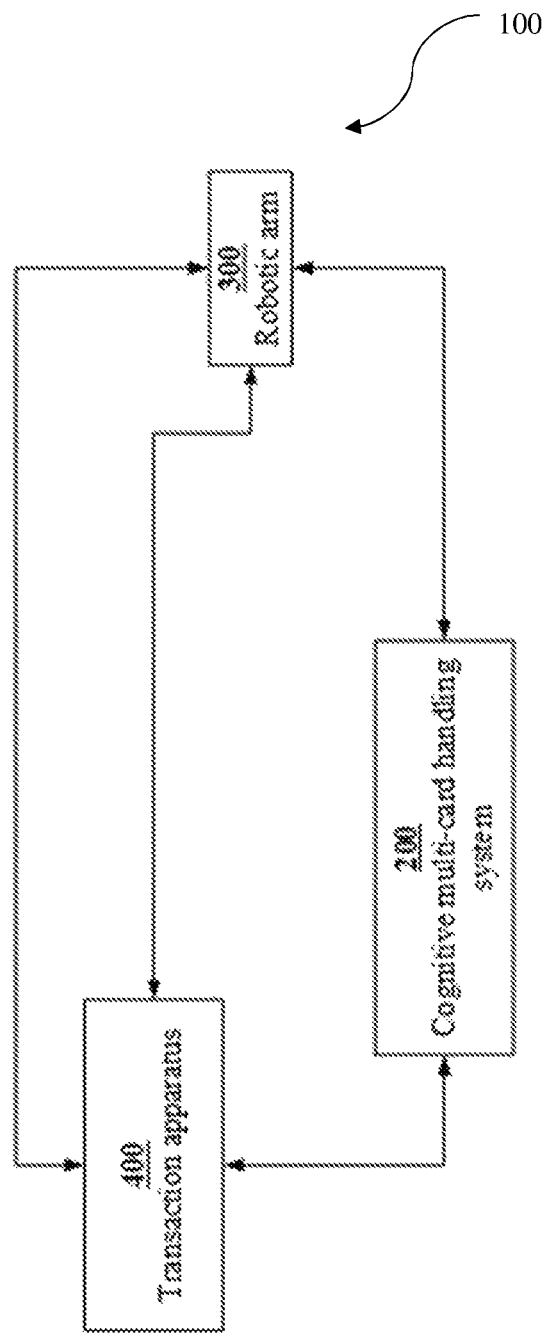
FIG. 1 is a block diagram showing an exemplary arrangement for automatic testing of a transaction apparatus, in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Automated card handling mechanisms in the current state of the art for testing a transaction apparatus have limitations including insufficient testing using multiple test cards of different card types. The present disclosure addresses this need and also provides a card stacking and ejecting setup to ensure no human intervention is required.

In accordance with the present disclosure, a cognitive multi-card handling system for testing the transaction apparatus provides an intelligent, automated and cost-effective solution for handling different test card types and variants. The cognitive multi-card handling system intelligently identifies, selects and ejects a required test card from a stack of different test card types and variants, as per one or more test cases by decoding and analyzing the one or more test cases. A testing method in accordance with the present disclosure, ensures smooth completion of an automatic test process consisting of a plurality of test cases without manual intervention.

Referring now to the drawings, and more particularly to FIG. 1 through FIG. 3C, where similar reference characters denote corresponding features consistently throughout the figures, there are shown preferred embodiments and these embodiments are described in the context of the following exemplary cognitive multi-card handling system for automatic testing of transaction apparatus and testing method.

FIG. 1 is a block diagram showing an exemplary arrangement (100) for automatic testing of a transaction apparatus (400), in accordance with an embodiment of the present disclosure. In an embodiment, a master test manager (not shown) of the transaction apparatus (400) may send one or more test cases from a plurality of test cases to a cognitive multi-card handling system (200), for performing one or more transaction operations associated with the one or more test cases to test the transaction apparatus (400). The cognitive multi-card handling system (200) ejects the required test card as per the one or more test cases for performing one or more transaction operations as part of the one or more test cases. In an embodiment, a robotic arm (300) may pick the required test card from the cognitive multi-card handling system (200) and submit to the transaction apparatus (400) for performing the one or more transaction operations.

In an embodiment, the transaction apparatus (400) is a Point Of Sale (POS) machine, an Automated Teller Machine (ATM) or any other transaction machines that performs the one or more transaction operations.

Figure 2A:
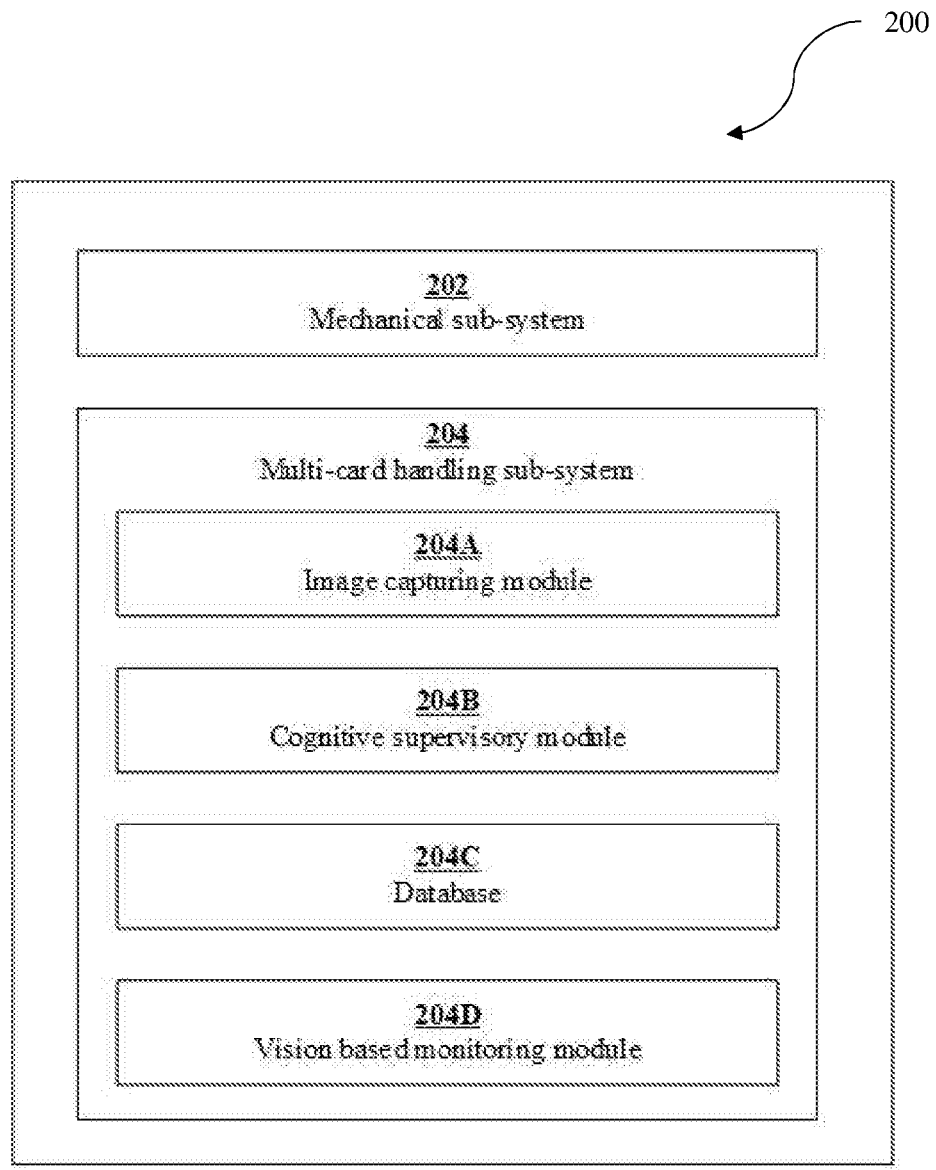
FIG. 2A illustrates a block diagram of a cognitive multi-card handling system with exemplary functional modules for automatic testing of a transaction apparatus, in accordance with an embodiment of the present disclosure.
Figure 2B:
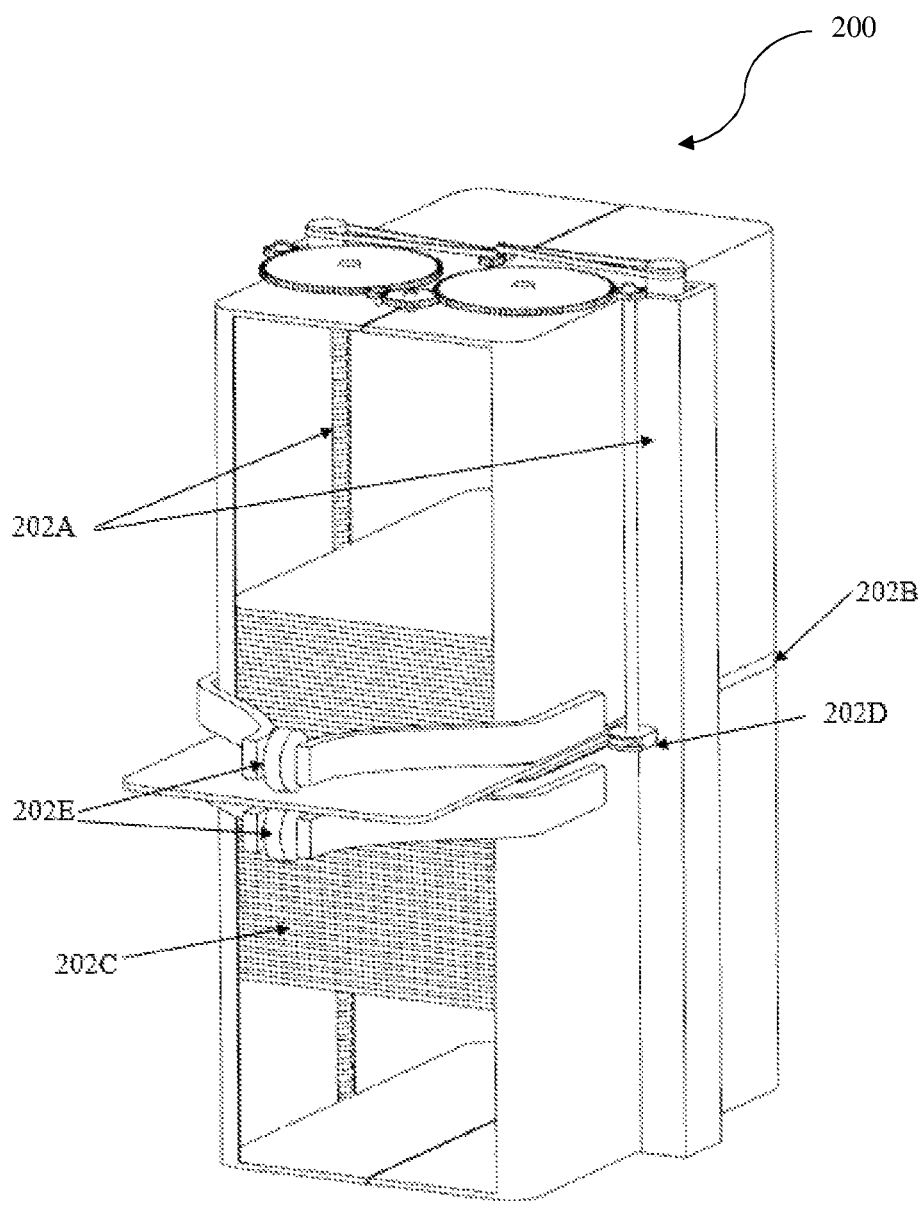
FIG. 2B shows a perspective view of a cognitive multi-card handling system, in accordance with an embodiment of the present disclosure.
Figure 2C:
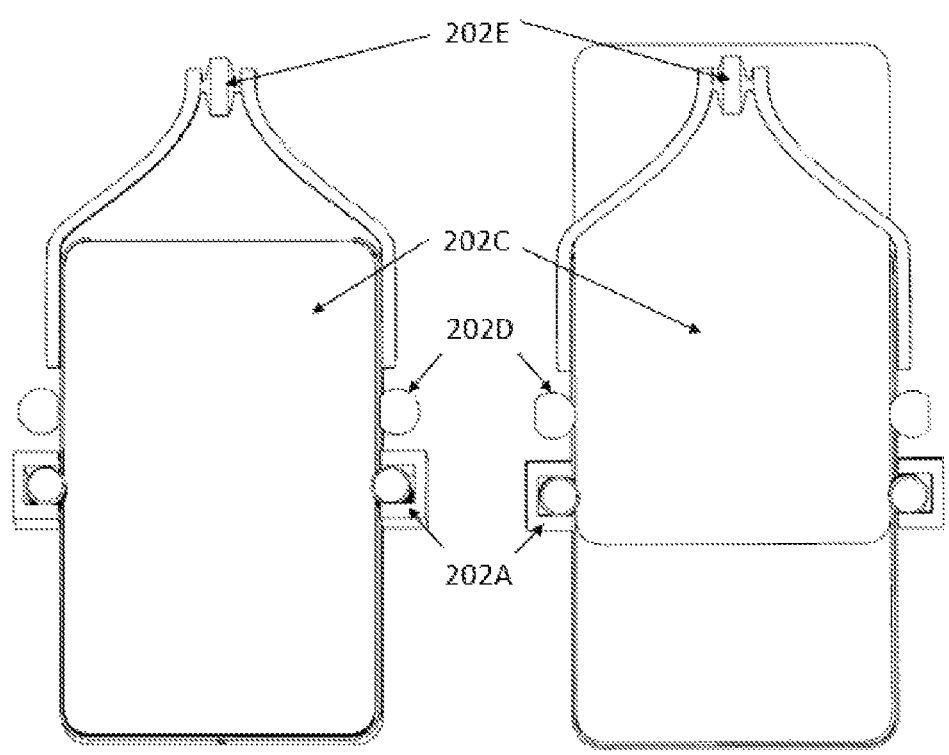
FIG. 2C is a schematic diagram showing a test card ejection mechanism of a cognitive multi-card handling system, in accordance with an embodiment of the present disclosure.

FIG. 2A illustrates a block diagram of the cognitive multi-card handling system (200) of FIG. 1 with exemplary functional modules for automatic testing of the transaction apparatus (400), in accordance with an embodiment of the present disclosure. FIG. 2B shows a perspective view of the cognitive multi-card handling system (200), and FIG. 2C is a schematic diagram showing a test card ejection mechanism of the cognitive multi-card handling system (200), in accordance with an embodiment of the present disclosure.

In an embodiment, the cognitive multi-card handling system (200) comprises a mechanical sub-system (202) and a multi-card handling sub-system (204). The mechanical sub-system (202) comprises a card stack (202C) for stacking a plurality of test cards, a linear mechanism (202A) for moving a card out vent (202B) to a position of a required test card from the card stack (202C), and a cam setup (202D) cooperating with the linear mechanism (202A) for ejecting the required test card from the card stack (202C). In an embodiment, the linear mechanism (202A) is provided with card transferring rollers (202E). The multi-card handling sub-system (204) comprises an image capturing module (204A), a cognitive supervisory module (204B), a database (204C) and a vision based monitoring module (204D). In an embodiment, the multi-card handling sub-system (204) handles test card operations and cooperates with the mechanical sub-system (202) which ejects the required test card out for testing the transaction apparatus (400) of FIG. 1.

In an embodiment, the database (204C) may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more functional modules (204A, 204B, 204D) of the multi-card handling sub-system (204) can be stored in the database (204C).

In accordance with the present disclosure, the functional modules (204A), (204B) and (204D) are one or more hardware processors that may be implemented as one or more microprocessors, microcomputers, microcontrollers, digital signal processors, central processing units, state machines, graphics controllers, logic circuitries, and/or any devices that manipulate signals based on operational instructions.

Figure 3A:
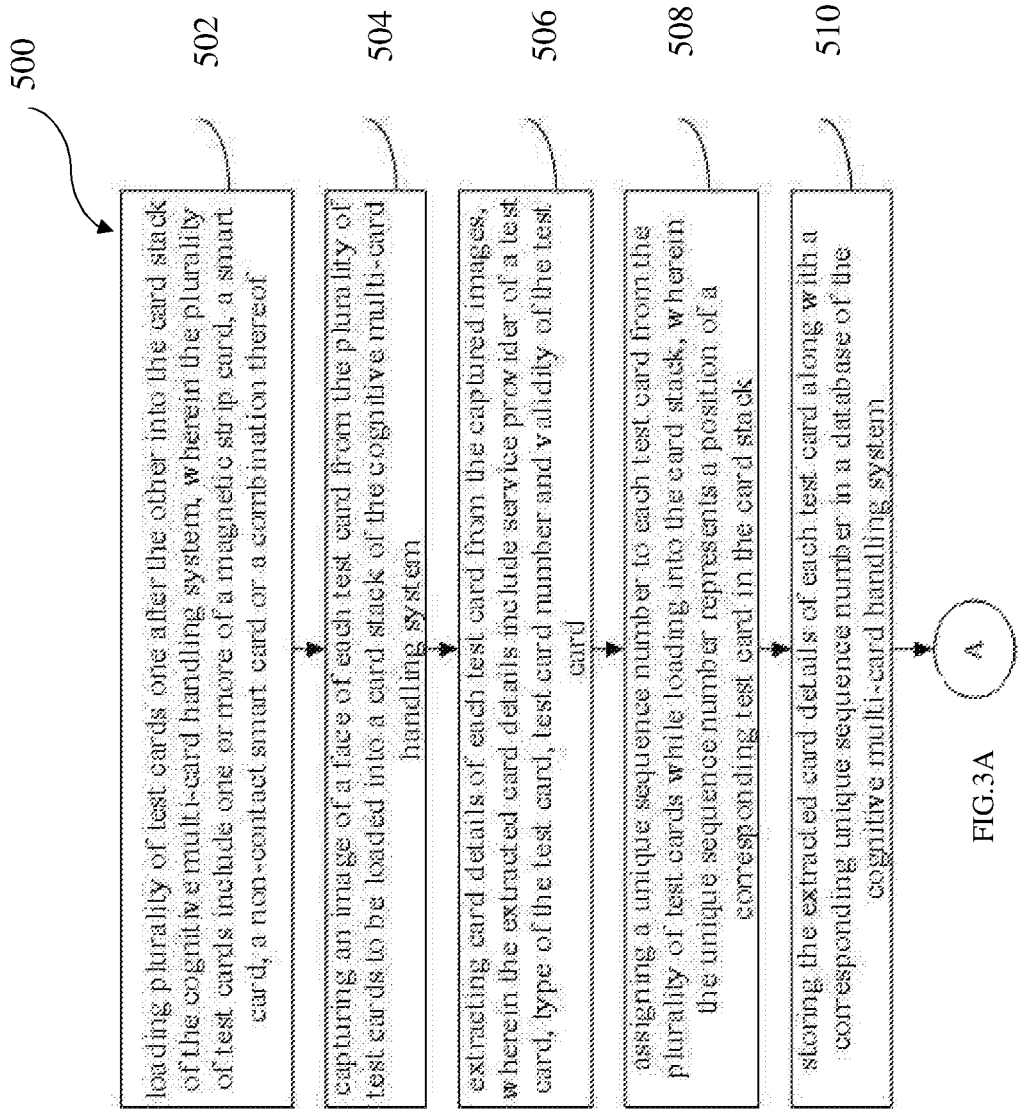
FIGS. 3A, 3B and 3C illustrate a flow diagram of a method for automatic testing of a transaction apparatus, where the transaction apparatus is operatively connected to a cognitive multi-card handling system, in accordance with an embodiment of the present disclosure.
Figure 3B:
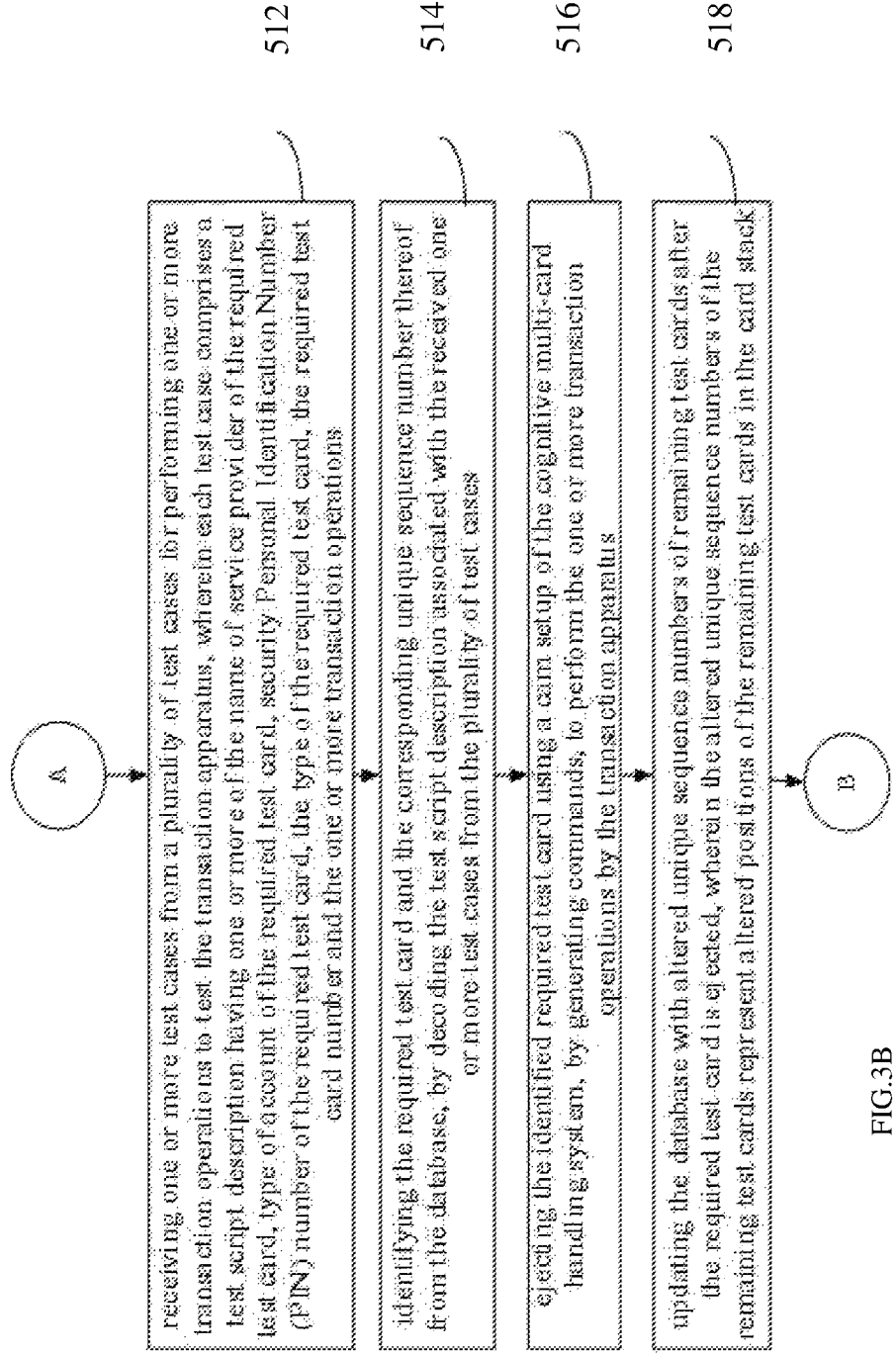
Figure 3C:
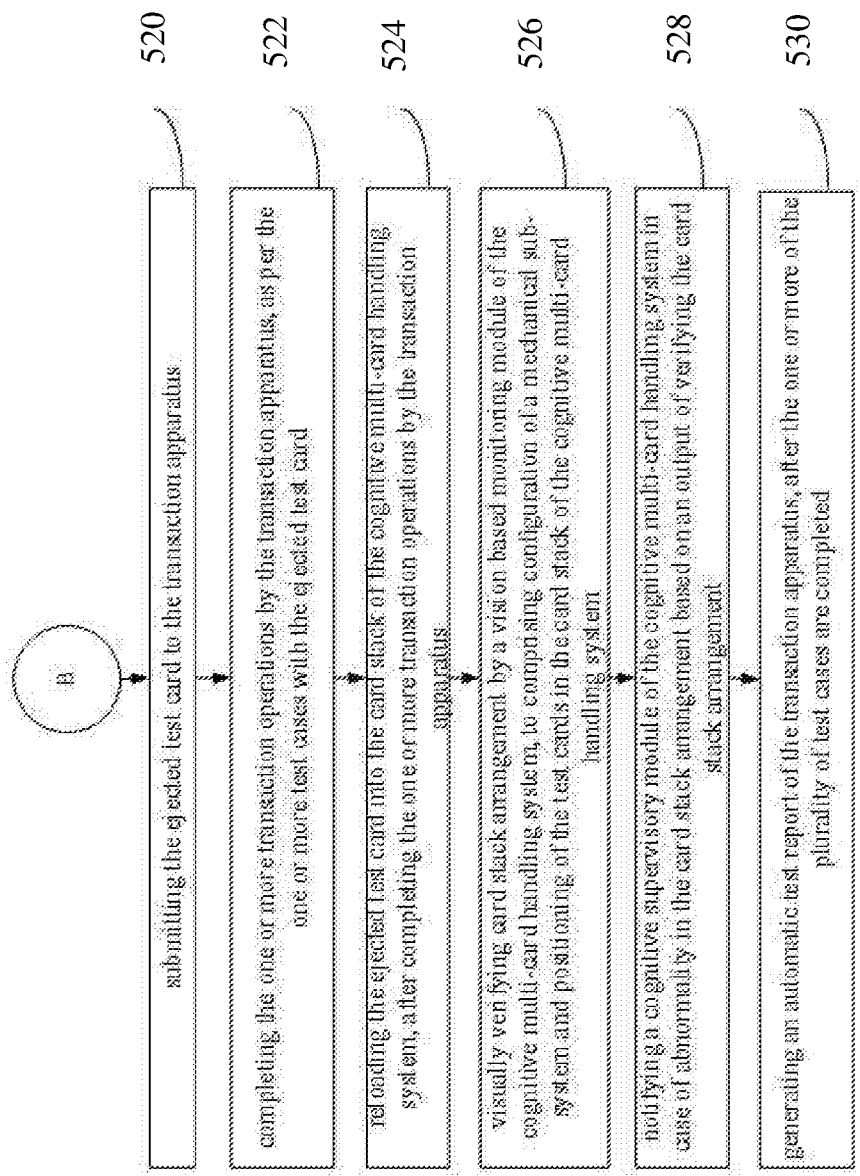

FIG. 3A through FIG. 3C illustrate a flow diagram of a method (500) for automatic testing of the transaction apparatus (400), where the transaction apparatus (400) is operatively connected to the cognitive multi-card handling system (200), in accordance with an embodiment of the present disclosure. The steps of the method (500) will now be explained in detail with reference to the arrangement (100) for automatic testing of a transaction apparatus of FIG. 1, the cognitive multi-card handling system (200) of FIG. 2A, FIG. 2B and FIG. 2C. Although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

In accordance with an embodiment of the present disclosure, at step 502, plurality of test cards are loaded one after the other into the card stack (202C) of the cognitive multi-card handling system (200). The plurality of test cards may include one or more of a magnetic strip card, a smart card, a non-contact smart card, and the like, or a combination of such different card types. In the magnetic strip card, a magnetic strip may be typically present on a backside of the test card. The smart card and the non-contact smart card may contain an Integrated Circuit (IC) chip may be typically present on a front side of the test card. The non-contact smart card may be used wirelessly with any compatible transaction apparatus for performing the one or more transaction operations. The test card may comprise both the magnetic strip and the Integrated Circuit (IC) chip, and may be used with any compatible transaction apparatus for performing the one or more transaction operations, through one of features i.e, the magnetic strip or the Integrated Circuit (IC) chip.

In an embodiment, the plurality of test cards are loaded one after the other into the card stack (202C) of the cognitive multi-card handling system (200) manually by a human operator. However, in accordance with an automated manner of testing, the robotic arm (400) may be used to load the plurality of test cards one after the other into the card stack (202C) of the cognitive multi-card handling system (200).

In an embodiment, the cognitive multi-card handling system (200) may be initialized and checked for readiness before loading the plurality of test cards to initiate the test process. The initialization step may comprise checking a normal working condition of the mechanical sub-system (202): including each position of the card stack (202C) to be reset, card stack (202C) to be empty without any test cards and so on.

In accordance with an embodiment of the present disclosure, at step 504, an image of a face of each test card from the plurality of test cards is captured using the image capturing module (204A) while loading into the card stack (202C) of the cognitive multi-card handling system (200). The face being captured is a front face or a back face having the magnetic strip or the Integrated Circuit (IC) chip. In accordance with the present disclosure, each test card is inserted with the appropriate face upfront while loading into the card stack (202C).

In accordance with an embodiment of the present disclosure, at step 506, card details of each test card are extracted by the cognitive supervisory module (204B), from the captured images. In an embodiment, the extracted card details include service provider of the test card, type of the test card, test card number and validity of the test card. In an embodiment, the service provider of the test card indicates information pertaining to a test card issuing authority such as MASTER CARD or VISA. The type of the test card indicates magnetic strip card, smart card, non-contact smart card or test card having a combination including a magnetic strip, a smart card etc. The test card number indicates a unique 16-digit number of the test card displayed typically on the front face of the test card. The validity of the test card indicate the validity period of the test card. The validity of the test card is displayed typically on the front face of the test card, typically in MM/YY format, where MM is a 2-digit number indicating a month and YY is a 2-digit number indicating a year.

In an embodiment, the card details are extracted from the captured images using real time image processing and machine learning algorithms. The real time image processing that includes grey scale conversion, image resizing, and noise reduction is applied on each captured image as and when the image of the face of each test card is captured by the image capturing module (204A). Each processed image is supplied as an input to the machine learning algorithms to learn and identify Regions of Interest (ROI) from the captured image, where the Regions of Interest (ROI) include the service provider of the test card, the type of the test card, the test card number and the validity of the test card displayed and captured from the appropriate face of the each test card.

An adaptive threshold method may be applied to separate the identified Regions of Interest (ROI) and a Convolutional Neural Network (CNN) based Optical Character Recognition (OCR) may be applied to train on card fonts and recognize numbers and text lines corresponding to the card details.

In an embodiment, the adaptive threshold method is also applied to orient each Region of Interest (ROI) image after rotating so that the numbers and the text lines are horizontal for recognizing the card details. The Convolutional Neural Network (CNN) based Optical Character Recognition (OCR) is also applied for edge detection and contour detection to detect and extract the numbers and text lines. In an embodiment, the machine learning algorithms may extract the service provider of the test card based on first four digits of the test card number.

In accordance with an embodiment of the present disclosure, at step 508, a unique sequence number is assigned by the cognitive supervisory module (204B), to each test card from the plurality of test cards while loading into the card stack (202C). The unique sequence number represents a position of a corresponding test card in the card stack (202C). In an embodiment, the test card that is loaded first into the card stack (202C) is placed at the bottom of the card stack (202C), whose position may be initialized either with zero (0) or one (1). The unique sequence number initializes either with zero (0) or one (1) as it represent the position of the card stack (202C). The unique sequence number is incremented based on number of test cards that are loaded into the card stack (202C). The test card that is loaded last into the card stack (202C) is placed at a top most position of the card stack (202C) and assigned with a highest unique sequence number. In an embodiment, if there are N number of test cards that are loaded into the card stack (202C), then the top most position of the card stack (202C) and the highest unique sequence number is N−1, if the unique sequence number is initialized with zero; and is N, if the unique sequence number is initialized with one.

In accordance with an embodiment of the present disclosure, at step 510, the extracted card details of each test card along with a corresponding unique sequence number are stored by the cognitive supervisory module (204B) in the database (204C) of the cognitive multi-card handling system (200).

In accordance with an embodiment of the present disclosure, at step 512, the one or more test cases from the plurality of test cases are received by the cognitive supervisory module (204B) of the cognitive multi-card handling system (200) for performing the one or more transaction operations to test the transaction apparatus (400). Each test case comprises a test script description having one or more of service provider of the required test card, type of account of the required test card, security Personal Identification Number (PIN) number of the required test card, the type of the required test card, the required test card number and the one or more transaction operations. In an embodiment, the test script description is associated with one required test card from the plurality of test cards that are loaded in the card stack (202C), for performing the one or more transaction operations to test the transaction apparatus (400).

In an embodiment, the service provider of the required test card indicates the test card issuing authority includes MASTER, VISA and a like. The type of account of the required test card indicates whether the test card is a debit card or a credit card, having a current account or a savings account and the like. The security Personal Identification Number (PIN) number of the required test card indicates an authentication code, which may be a numeric number typically referred as a transaction PIN or an Automated Teller Machine (ATM) PIN, or alpha-numeric transaction password associated with the test card or a One Time Password (OTP). The type of the required test card may include the magnetic strip card, the smart card, the non-contact smart card or the test card having a combination including the magnetic strip, the smart card etc. The required test card number indicates a unique 16-digit number of the test card present typically on the front face of the test card. The one or more transaction operations include one or more of paying a transaction amount, checking balance of reward points, redeeming the reward points, checking promotional offers and so on.

In an embodiment, the master test manager of the transaction apparatus (400) is configured to send one or more test cases from the plurality of test cases to the cognitive supervisory module (204B). The master test manager may send one test case or more than one test cases at a time, based on an associated test script description.

In accordance with an embodiment of the present disclosure, at step 514, the required test card and the corresponding unique sequence number are identified from the database (204C) by the cognitive supervisory module (204B). The respective test script description associated with the received one or more test cases from the plurality of test cases are decoded by the cognitive supervisory module (204B).

In an embodiment, the test script description associated with the received one or more test cases from the plurality of test cases are decoded by the cognitive supervisory module (204B), using Natural Language Processing (NLP) techniques. The test script description may be unstructured; contents of the test script description that is written in natural language may be in arbitrary stream of Unicode characters (typically UTF-8), and may not be conveniently tagged. The Natural Language Processing (NLP) techniques may be applied on the arbitrary character stream to convert into sequence of lexical stream containing natural words, phrases, and syntactic markers etc. for better understanding of the contents of the test script description. The decoded test script description after applying the NLP techniques, may contain one or more of the service provider of the required test card, the type of account of the required test card, the security Personal Identification Number (PIN) number of the required test card, the type of the required test card, the required test card number and the one or more transaction operations.

In an embodiment, the NLP techniques include one or more of text vectorization, Word2Vec, Dimensionality Reduction typically Singular Value Decomposition (SVD), DIMSUM algorithm and Nearest Neighbor algorithm, Classification algorithms such as Decision Tree, Random Forest and Naïve Bayes and Gradient Boosted Trees, Clustering algorithms such as K-Means, Latent Dirichlet allocation (LDA) and Power Iteration Clustering (PIC) algorithm, and Logistic Regression.

In an embodiment, the step of identifying the required test card and the corresponding unique sequence number from the database (204C) is preceded by decoding the test script description associated with the received one or more test cases from the plurality of test cases to identify an order of execution of the one or more test cases from the plurality of test cases. In an embodiment, the NPL techniques may decode the test script description associated with the received one or more test cases, and may combine or separate the one or more test cases associated with the received one or more test cases of the plurality of test cases, based on similar type of the required test card, same required test card number and so on, such that the required test card is easily identified and utilized to perform the one or more test cases in single instance.

In an embodiment, the cognitive supervisory module (204B) is configured to plan an order of execution of the one or more test cases from the plurality of test cases and ensure completion of the plurality of test cases by consulting with the master test manager of the transaction apparatus (400).

In accordance with an embodiment of the present disclosure, at step 516, the identified required test card is ejected by the cognitive supervisory module (204B) using the cam setup (202D) of the cognitive multi-card handling system (200), by generating commands, to perform the one or more transaction operations by the transaction apparatus (400). In an embodiment, the step of ejecting (516) is preceded by configuring a motion step by the cognitive supervisory module (204B). The configuring involves deciding number of rotations to be performed by the linear mechanism (202A) for positioning the card out vent (202B) to select the identified required test card from the card stack (202C), based on the identified unique sequence number.

In accordance with an embodiment of the present disclosure, at step 518, the database (204C) is updated by the cognitive supervisory module (204B) with altered unique sequence numbers of remaining test cards after the required test card is ejected. The altered unique sequence numbers of the remaining test cards represent altered positions of the remaining test cards in the card stack (202C). In an embodiment, the unique sequence numbers of the test cards that are placed above the required test card in the card stack (202C), are altered based on revised positions of each test card in the card stack (202C).

For example, if the position of the required test card in the card stack (202C) is P, then the test card that is present immediately above the required test card in the card stack (202C) occupy the position P of the ejected test card once the required test is ejected. Hence the altered sequence number for the test card that is present immediately above the required test card becomes P. accordingly, altered unique sequence numbers of remaining test cards that are present above the required test card are assigned with the altered sequence numbers and updated in the database (204C). The position of the each test card that is placed below the ejected test card is not changed and hence the unique sequence number of each test card that is placed below the ejected test card remains the same.

In an embodiment, the cognitive supervisory module (204B) is configured to determine the number of test cards available in the card stack (202C) and accordingly identify a highest unique sequence number based on the number of available test cards, as and when the required test card is ejected.

In accordance with an embodiment of the present disclosure, at step 520, the ejected test card is submitted to the transaction apparatus (400). In an embodiment the robotic arm (300) may pick the ejected test card from the cognitive multi-card handling system (200) and submit the ejected test card to the transaction apparatus (400). In an embodiment, the robotic arm (300) is configured to receive a control signal by the master test manager of the transaction apparatus (400) to pick the ejected test card and submit the ejected test card to the transaction apparatus (400). In an embodiment, each control signal corresponds to each of the one or more test cases from the plurality of test cases that are being sent by the master test manager of the transaction apparatus (400) to the cognitive multi-card handling system (200).

In an embodiment, the robotic arm (300) is a multi Degree Of Freedom (DOF) robotic arm comprising a specialized gripper for holding the test card.

In an embodiment, the robotic arm (300) may submit the ejected test card to the transaction apparatus (400) to perform the one or more transaction operations. Typically, the one or more transaction operations may be performed either by swiping, inserting or tapping, based on the type of the ejected test card. In an embodiment, a pin-pad device may be utilized which may be integrated within the transaction apparatus (400) or externally connected to the transaction apparatus (400) for performing swiping, inserting or tapping, based on the type of the ejected test card.

In an embodiment, if the ejected test card is the magnetic strip card, then the robotic arm (300) may submit by inserting the ejected test card into the pin-pad device. If the ejected test card is the non-contact smart card, then the robotic arm (300) may submit by tapping on the pin-pad device. Similarly, if the ejected test card contain both magnetic strip and the Integrated Circuit (IC) chip, then the robotic arm (300) may submit either by inserting, swiping or tapping with the pin-pad device as per the one or more transaction operations.

In an embodiment, the ejected test card may be submitted by the human operator or the robotic arm (300) to the pin-pad device of the transaction apparatus (400) by entering the ejected test card number, the security Personal Identification Number (PIN) number of the ejected test card, the validity of the ejected test card and so on, if there is a problem with the swiping, the inserting or the tapping.

In accordance with an embodiment of the present disclosure, at step 522, the one or more transaction operations are completed with the ejected test card by the transaction apparatus (400), as per the one or more test cases. In an embodiment, the master test manager of the transaction apparatus (400) may complete one or more transaction operations as per the one or more test cases and ensure completion of the one or more transaction operations and then intimate the robotic arm (300) to re-pick the ejected test card after successful completion of the one or more transaction operations.

In an embodiment, the one or more transaction operations include one or more of paying a transaction amount, checking balance of reward points, redeeming the reward points, checking promotional offers and so on. In an embodiment, the one or more transaction operations also include submitting specific type of the required test card or the type of the account of the required test card.

In an embodiment, the robotic arm (300) may receive an acknowledgement from the master test manager of the transaction apparatus (400) after completing the one or more transaction operations corresponding to the one or more test cases from the plurality of test cases.

In accordance with an embodiment of the present disclosure, at step 524, the ejected test card is reloaded into the card stack (202C) of the cognitive multi-card handling system (200), after completing the one or more transaction operations by the transaction apparatus (400). In an embodiment, the robotic arm (300) may reload the ejected test card into the card stack (202C).

In an embodiment, an image of the face of the ejected test card is captured by the image capturing module (204A), while reloading into the card stack (202C) of the of the cognitive multi-card handling system (200).

In accordance with an embodiment of the present disclosure, at step 524a, the card details of the ejected test card are extracted from the captured image, when reloading the ejected test card into the card stack (202C) of the cognitive multi-card handling system (200).

In an embodiment, the card details of the ejected test card are extracted from the captured image using real time image processing and machine learning algorithms. The real time image processing that includes grey scale conversion, image resizing, and noise reduction is applied on the each captured image as and when the image of the face of each test card is captured by the image capturing module (204A). Each processed image is supplied as a input to the machine learning algorithms to learn and identify Regions of Interest (ROI) from the captured image, where the Regions of Interest (ROI) containing the service provider of the ejected test card, the type of the ejected test card, the ejected test card number and the validity of the ejected test card that are present on the front face of the ejected test card.

An adaptive threshold method is applied to separate the identified Regions of Interest (ROI) and a Convolutional Neural Network (CNN) based Optical Character Recognition (OCR) is applied to train on card fonts, and recognize numbers and text lines corresponding to the card details.

In an embodiment, the adaptive threshold method is also applied to orient each Region of Interest (ROI) after rotating so that the numbers and the text lines are horizontal for recognizing the card details. The Convolutional Neural Network (CNN) based Optical Character Recognition (OCR) is also applied for edge detection and contour detection to detect and extract the numbers and text lines. In an embodiment, the machine learning algorithms may extract the service provider of the ejected test card based on first four digits of the ejected test card number.

In accordance with an embodiment of the present disclosure, at step 524b, the ejected test card number retrieved from the extracted card details is verified by the cognitive supervisory module (204B) with the database (204C) to check whether the ejected test card number is present in the database (204C) or not. If the ejected test card number is not present, then the cognitive supervisory module (204B) intimate the master test manager of the transaction apparatus (400) and request for manual intervention.

In accordance with an embodiment of the present disclosure, at step 524c, a new unique sequence number is assigned to the ejected test card by the cognitive supervisory module (204B), if the ejected test card number is present in the database (204C). The new unique sequence number corresponding to the topmost available position in the card stack (202C). In an embodiment, the new unique sequence number is equal to the total number of test cards in the card stack (202C) after the ejected test card is reloaded into the topmost available position in the card stack (202C).

In accordance with an embodiment of the present disclosure, at step 524d, the assigned new unique sequence number for the reloaded test card is updated in the database (204C), by the cognitive supervisory module (204B), in place of the existing unique sequence number.

In accordance with an embodiment of the present disclosure, at step 526, the card stack arrangement is visually verified by the vision based monitoring module (204D) of the cognitive multi-card handling system (200). In an embodiment, the card stack arrangement comprises configuration of the mechanical sub-system (202) and positioning of the test cards in the card stack (202C) of the cognitive multi-card handling system (200). In an embodiment, verifying the card stack arrangement includes checking intact condition of the plurality of test cards in the card stack (202C), orientation and position of each test card of the plurality of test cards in the card stack (202C). In an embodiment, the configuration of the mechanical sub-system (202) includes arrangement and working condition of each component of the mechanical sub-system such that that required test card is ejected as per the configured motion step. In an embodiment, the vision based monitoring module (204D) monitors the position and the orientation of the ejected test card while reloading into the card stack (202C). In an embodiment, the cognitive supervisory module (204B) ensures readiness of the mechanical sub-system (202) for performing the subsequent test cases, using the vision based monitoring module (204D) of the cognitive multi-card handling system (200).

In accordance with an embodiment of the present disclosure, at step 528, the cognitive supervisory module (204B) is notified by the vision based monitoring module (204D), in case of abnormality in the card stack arrangement based on an output of verifying the card stack arrangement. If abnormally exists, then the cognitive supervisory module (204B) intimate the master test manager of the transaction apparatus (400) and request for manual intervention to correct the abnormality.

In accordance with an embodiment of the present disclosure, at step 530, an automatic test report of the transaction apparatus (400) is generated by the master test manager, after the one or more of the plurality of test cases are completed. In an embodiment, the automatic test report may comprises test results corresponding to the one or more transaction operations of the one or more of the plurality of test cases that are performed by the master test manager of the transaction apparatus (400).

In accordance with the present disclosure, the cognitive supervisory module (204B) of the cognitive multi-card handling system (200) for testing of the transaction apparatus (400) provides an intelligent solution through the machine learning algorithms and the NPL techniques to extract the test card details, identify the required test card by decoding and analyzing the test script description of the one or more test cases, select the required test card from the heterogeneous stack of different type of test cards and variants, and configure the motion step for the mechanical sub-system (202) to eject the required test card for performing the one or more transaction operations associated with the one or more test cases to test the transaction apparatus (400). The disclosed automated card handling mechanism is robust, simple and convenient for performing the testing of transaction apparatus (400). The disclosed cognitive multi-card handling system (200) provides greater flexibility and enhanced performance in handling different type of test cards and variants with the use of the machine learning algorithms and the NPL techniques.

The vision based monitoring module (204D) of the cognitive multi-card handling system (200) continuously monitors the card stack arrangement and ejection process, which ensures smooth completion of automatic testing method consisting of thousands of test cases without much manual intervention. Hence the time required to complete the test process is drastically reduced. Accordingly, the operational cost, planning cost are reduced and time to market is increased.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It is intended that the disclosure and examples be considered as exemplary only, with a true scope and spirit of disclosed embodiments being indicated by the following claims.

What is claimed is:

1. A cognitive multi-card handling system for automatic testing of a transaction apparatus, the system comprising:
   a mechanical sub-system comprising:
      a linear mechanism configured to move a card out vent to a position of a required test card from a card stack;
      a cam setup cooperating with the linear mechanism to eject the required test card from the card stack; and
   a multi-card handling sub-system comprising:

an image capturing module configured to capture an image of a face of each test card from a plurality of test cards to be loaded into the card stack, wherein the plurality of test cards include one or more of a magnetic strip card, a smart card, a non-contact smart card or a combination thereof;

a cognitive supervisory module configured to:
extract card details of each test card from the captured images, wherein the extracted card details include service provider of a test card, type of the test card, test card number and validity of the test card;

assign a unique sequence number to each test card from the plurality of test cards while loading into the card stack, wherein the unique sequence number represents the position of a corresponding test card in the card stack;

store the extracted card details of each test card along with a corresponding unique sequence number in a database;

receive one or more test cases from a plurality of test cases for performing one or more transaction operations to test the transaction apparatus, wherein each test case comprises a test script description having one or more of service provider of the required test card, type of account of the required test card, security Personal Identification Number (PIN) number of the required test card, the type of the required test card, the required test card number and the one or more transaction operations;

identify the required test card and the corresponding unique sequence number thereof from the database, by decoding the test script description associated with the received one or more test cases from the plurality of test cases;

configure a motion step involving number of rotations by the linear mechanism for positioning the card out vent to select the identified required test card from the card stack, based on the identified unique sequence number;

eject the identified required test card using the cam setup, by generating commands, to perform the one or more transaction operations by the transaction apparatus; and update the database with altered sequence numbers of remaining test cards after the identified required test card is ejected, wherein the altered sequence numbers of the remaining test cards represent altered positions of the remaining test cards in the card stack; and a vision based monitoring module configured to:
visually verify card stack arrangement comprising configuration of the mechanical sub-system and positioning of the test cards in the card stack; and notify the cognitive supervisory module in case of abnormality in the card stack arrangement based on an output of verifying the card stack arrangement.

2. The system of claim 1, further comprising a robotic arm configured to cooperate with the transaction apparatus and configured to:
receive a control signal corresponding to the one or more test cases from the plurality of test cases for initiating the one or more transaction operations;

pick up the required test card that is ejected from the card out vent;

submit the required test card that is ejected to the transaction apparatus for performing one or more transaction operations corresponding to the one or more test cases from the plurality of test cases;

receive an acknowledgement of completion of the one or more transaction operations corresponding to the one or more test cases from the plurality of test cases; and reload the test card into the card stack after completion of the one or more transaction operations corresponding to the one or more test cases from the plurality of test cases associated with the test card.

3. The system of claim 2, wherein the robotic arm is configured to submit the required test card that is ejected, to the transaction apparatus, either by swiping, inserting or tapping, based on the type of the ejected test card.

4. The system of claim 1, wherein the image capturing module is further configured to capture an image of the face of the ejected test card while reloading into the card stack, after executing the one or more transaction operations by the transaction apparatus.

5. The system of claim 1, wherein the cognitive supervisory module is further configured to perform one or more of:
reloading of the ejected test card by:
extracting the card details of the ejected test card from the captured image thereof when reloading the ejected test card into the card stack;

verifying the ejected test card number from the extracted card details with the database;

assign a new unique sequence number to the ejected test card corresponding to a topmost available position in the card stack; and update the database with the assigned new unique sequence number for the reloaded test card; or decode the test script description associated with the received one or more test cases from the plurality of test cases to identify an order of execution of the one or more test cases from the plurality of test cases.

6. The system of claim 1, wherein the transaction apparatus is a Point Of Sale (POS) machine or an Automated Teller Machine (ATM).

7. A method for automatic testing of a transaction apparatus, where the transaction apparatus is operatively connected to a cognitive multi-card handling system, the method comprising:
loading a plurality of test cards one after the other into the card stack of the cognitive multi-card handling system, wherein the plurality of test cards include one or more of a magnetic strip card, a smart card, a non-contact smart card or a combination thereof;

capturing an image of a face of each test card from the plurality of test cards to be loaded into a card stack of the cognitive multi-card handling system;

extracting card details of each test card from the captured images, wherein the extracted card details include service provider of a test card, type of the test card, test card number and validity of the test card;

assigning a unique sequence number to each test card from the plurality of test cards while loading into the card stack, wherein the unique sequence number represents a position of a corresponding test card in the card stack;

storing the extracted card details of each test card along with a corresponding unique sequence number in a database of the cognitive multi-card handling system;

receiving one or more test cases from a plurality of test cases for performing one or more transaction operations to test the transaction apparatus, wherein each test case comprises a test script description having one or more of the name of service provider of the required test card, type of account of the required test card, security Personal Identification Number (PIN) number of the required test card, the type of the required test card, the required test card number and the one or more transaction operations;

identifying the required test card and the corresponding unique sequence number thereof from the database, by decoding the test script description associated with the received one or more test cases from the plurality of test cases;

ejecting the identified required test card using a cam setup of the cognitive multi-card handling system, by generating commands, to perform the one or more transaction operations by the transaction apparatus;

updating the database with altered unique sequence numbers of remaining test cards after the required test card is ejected, wherein the altered unique sequence numbers of the remaining test cards represent altered positions of the remaining test cards in the card stack;

submitting the ejected test card to the transaction apparatus;

completing the one or more transaction operations by the transaction apparatus, as per the one or more test cases with the ejected test card;

reloading the ejected test card into the card stack of the cognitive multi-card handling system, after completing the one or more transaction operations by the transaction apparatus;

visually verifying card stack arrangement by a vision based monitoring module of the cognitive multi-card handling system, to comprising configuration of a mechanical sub-system and positioning of the test cards in the card stack of the cognitive multi-card handling system; and notifying a cognitive supervisory module of the cognitive multi-card handling system in case of abnormality in the card stack arrangement based on an output of verifying the card stack arrangement.

8. The method of claim 7, wherein submitting the ejected test card to the transaction apparatus comprises receiving a control signal corresponding to the one or more test cases from the plurality of test cases for initiating the one or more transaction operations, the submitting includes either by swiping, inserting or tapping, based on the type of the ejected test card.

9. The method of claim 8, wherein the submitting also includes manually entering the ejected test card number, the security Personal Identification Number (PIN) number of the ejected test card, the validity of the ejected test card, if the step of swiping, inserting or tapping fails.

10. The method of claim 8, wherein submitting the ejected test card to the transaction apparatus is performed by a robotic arm.

11. The method of claim 7, wherein identifying the required test card and the corresponding unique sequence number thereof from the database is preceded by decoding the test script description associated with the received one or more test cases from the plurality of test cases to identify an order of execution of the one or more test cases from the plurality of test cases.

12. The method of claim 7, wherein reloading the test card into the card stack of the cognitive multi-card handling system comprises:

receiving an acknowledgement of completion of the one or more transaction operations of a corresponding to the one or more test cases from the plurality of test cases; and capturing an image of the face of the ejected test card while reloading into the card stack.

13. The method of claim 7, wherein reloading the ejected test card into the card stack comprises:

extracting the card details of the ejected test card from the captured image thereof when reloading the ejected test card into the card stack of the cognitive multi-card handling system;

verifying the ejected test card number from the extracted card details with the database of the cognitive multi-card handling system;

assigning a new unique sequence number to the ejected test card corresponding to a topmost available position in the card stack of the cognitive multi-card handling system; and updating the database with the assigned new unique sequence number for the reloaded test card.

14. The method of claim 7, wherein the ejecting is preceded by configuring a motion step by the cognitive supervisory module of the cognitive multi-card handling system, the motion step involving number of rotations by a linear mechanism for positioning a card out vent of the cognitive multi-card handling system for selecting the identified required test card from the card stack, based on the identified unique sequence number.

15. The method of claim 7, wherein the ejecting is followed by a step of picking the ejected test card by the robotic arm.

16. The method of claim 7, wherein the reloading is performed by the robotic arm.

17. The method of claim 7, further comprising generating an automatic test report of the transaction apparatus, after the one or more of the plurality of test cases are completed.

* * * * *